(12) United States Patent
Newkirk et al.

(10) Patent No.: US 11,162,785 B2
(45) Date of Patent: Nov. 2, 2021

(54) ASSISTED PORTABLE VEHICLE SENSOR CALIBRATION ALIGNMENT

(71) Applicant: Robert Bosch GmbH, Stuttgart (DE)

(72) Inventors: Dan Newkirk, Owatonna, MN (US); Jeremy Harmer, Austin, MN (US); Robert Meitzler, Warren, MI (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/962,480

(22) PCT Filed: Feb. 20, 2019

(86) PCT No.: PCT/EP2019/054153
§ 371 (c)(1),
(2) Date: Jul. 15, 2020

(87) PCT Pub. No.: WO2019/162296
PCT Pub. Date: Aug. 29, 2019

(65) Prior Publication Data
US 2021/0080253 A1 Mar. 18, 2021

Related U.S. Application Data

(60) Provisional application No. 62/635,193, filed on Feb. 26, 2018.

(51) Int. Cl.
*G01S 7/497* (2006.01)
*G01B 11/275* (2006.01)

(52) U.S. Cl.
CPC .................. *G01B 11/275* (2013.01)

(58) Field of Classification Search
CPC ....... G01B 11/275; G01B 11/27; G01B 11/26; G01M 11/067; G01S 17/936;
(Continued)

(56) References Cited

U.S. PATENT DOCUMENTS 6,813,015 B2 * 11/2004 Knoedler ............. G01M 11/067
356/155
7,121,011 B2 10/2006 Murray et al.
(Continued)

FOREIGN PATENT DOCUMENTS

DE 2838725 3/1980
EP 1091186 4/2001
(Continued)

*Primary Examiner* — Hoa Q Pham
(74) *Attorney, Agent, or Firm* — David Kovacek; Maginot, Moore & Beck LLP

(57) ABSTRACT

The apparatus comprises a target structure (101) having a reflective surface (102) and a crossbar structure oriented parallel to an axel of the vehicle; a first reference structure (107) having a pass-through channel (108) and an aiming surface (109); a second reference structure (111) having a laser emitter (102). In the method the first reference structure is aligned with a midpoint of a side of the vehicle nearest to the target structure and the second reference structure with the laser emitter is aligned with a midpoint of a side of the vehicle furthest from the target structure with the laser emitter oriented toward the target structure. The emitted laser beam passes through the channel of the first reference structure and is reflected by the reflective surface. The relative angle and alignment of the target structure at the reflection position is adjusted such that the reflected beam is reflected onto a designated region of the aiming surface on the first structure. The laser measurement may be in the form of a line generator to provide visual aid to the user in alignment.

17 Claims, 6 Drawing Sheets

(58) Field of Classification Search
CPC .... G01S 7/4972; G01S 13/867; G01S 13/931; G01S 2007/4034
USPC .... 356/155, 154, 138, 399–400, 140, 141.2; 33/288, 645, 286, 613
See application file for complete search history.

(56) References Cited

U.S. PATENT DOCUMENTS

| | | | | |
|---|---|---|---|---|
| 7,535,558 | B2* | 5/2009 | Uffenkamp | G01B 11/2755 |
| | | | | 356/138 |
| 8,020,307 | B2 | 9/2011 | Schwindt | |
| 8,970,834 | B2* | 3/2015 | Soininen | G01S 13/931 |
| | | | | 356/138 |
| 10,935,643 | B2* | 3/2021 | Lin | G01S 7/4972 |
| 2014/0121962 | A1* | 5/2014 | Rao | G01C 21/18 |
| | | | | 701/500 |
| 2017/0003141 | A1 | 1/2017 | Voeller et al. | |
| 2019/0249985 | A1* | 8/2019 | Stieff | G01S 7/4972 |

FOREIGN PATENT DOCUMENTS

| | | |
|---|---|---|
| JP | 2008151733 | 7/2008 |
| WO | 2017198264 | 11/2017 |

* cited by examiner

ASSISTED PORTABLE VEHICLE SENSOR CALIBRATION ALIGNMENT

CROSS-REFERENCE TO RELATED APPLICATIONS

This application is a 35 U.S.C. § 371 National Stage Application of PCT/EP201/054153 filed on Feb. 20, 2019, which claims the benefit of U.S. Provisional Application No. 62/635,193, filed on Feb. 26, 2018, the disclosures of which are herein incorporated by reference in their entirety.

TECHNICAL FIELD

This disclosure relates to the calibration of sensors, and in particular sensors using radar, optical, or sonic signals disposed within a vehicle for use with an Advanced Driver Assistance System.

BACKGROUND

In vehicles having an Advance Driver Assistance System, the associated sensors require calibration to achieve proper operation. Calibration may be required as part of regular maintenance, or on particular occasions such as the repair or replacement of the windshield or other glass components of the vehicle. Certain vehicular glass repairs may be completed on-site, such as at the vehicle owner's home or place of business. Current calibration tools are typically bulky and stationary, and require the vehicle to be brought into an automotive service center or similar controlled environment.

It is therefore desirable to have a calibration apparatus that is sufficiently mobile that the calibration procedure may be performed at a desired location outside of an automotive service center.

SUMMARY

One aspect of this disclosure is directed to an alignment apparatus comprised of multiple parts and operable to place a target structure in a proper position to perform a vehicle sensor calibration.

Another aspect of this disclosure is directed to a method for placing a target structure component of a calibration apparatus in the proper position and alignment with a vehicle in order to perform a successful sensor calibration of the vehicle.

A further aspect of this disclosure is directed to the utilization of a laser emitter in order to alignment the components of the calibration apparatus with respect to the vehicle.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
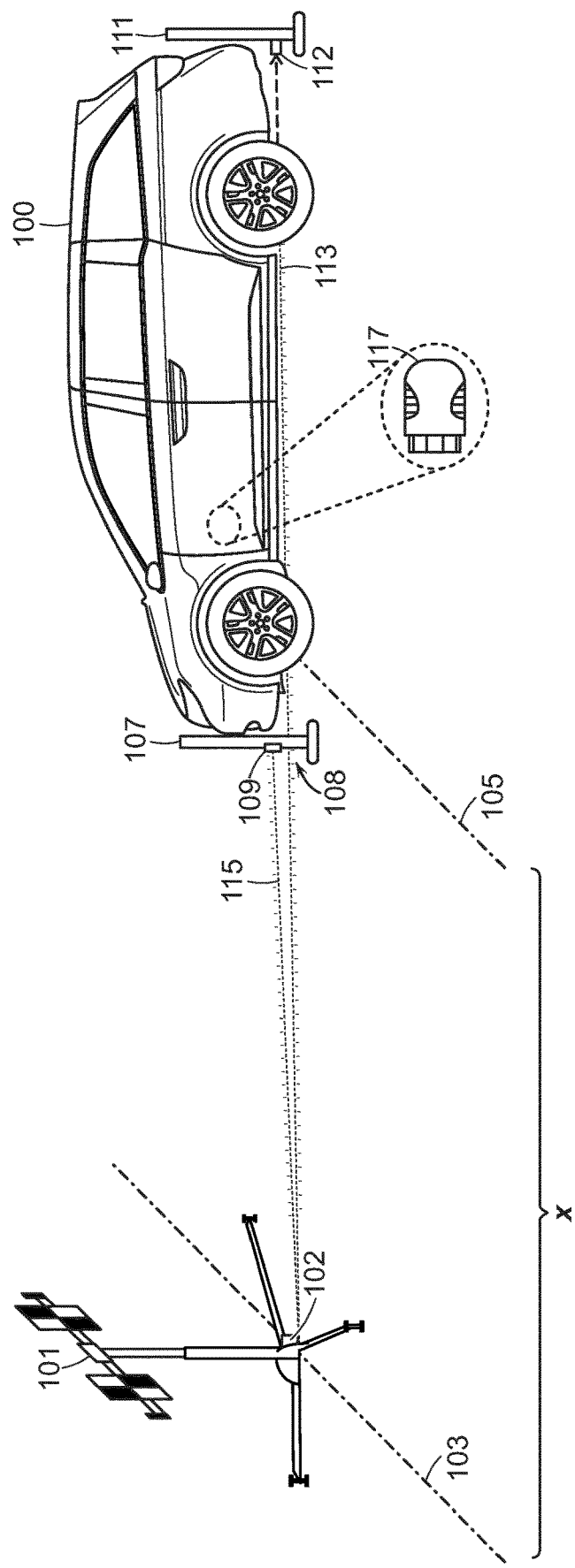
FIG. 1 is an illustration of a calibration apparatus positioned with respect to a vehicle during a sensor calibration of the vehicle.

FIG. 1 depicts a vehicle 100 during a sensor calibration of the vehicle using a vehicle sensor calibration apparatus according to an embodiment of the teachings disclosed herein. The vehicle sensor calibration apparatus depicted is a multi-component apparatus, utilizing a target structure 101 as a reference for the sensors during the calibration. Target structure 101 may comprise a reflective surface 102 disposed at least partially upon the base target structure 101. Target structure 101 is positioned alone a datum line 103 defined in the depicted embodiment as a line running parallel to an axle line 105 of vehicle 100 at a predetermined distance x. In the depicted embodiment, axle line 105 is defined as a line formed though the center points of the front wheels of vehicle 100, but other embodiments may comprise other arrangements without deviating from the teachings disclosed herein. In practice, the distance, angle and position of target structure 101 with respect to vehicle 100 will be determined by the configuration and specification of vehicle 100 and the sensors thereof.

The vehicle sensor calibration apparatus also comprises a first reference structure 107 having a pass-through channel 108 and an aiming surface 109. The pass-through channel 108 may permit light to pass-through the body of first reference structure 107. The vehicle sensor calibration apparatus also comprises a second reference structure 111 having a laser emitter 112.

During setup for the sensor calibration, first reference structure 107 is positioned at a center-point of a side of vehicle 100 nearest to target structure 101, with the aiming surface 109 oriented in the direction of target structure 101. Second reference structure 111 is positioned at a center-point of an opposite side of vehicle 100 with laser emitter 112 oriented in the direction of first reference structure 107. In the depicted embodiment, first reference structure 107 is positioned at the front of vehicle 100 and second reference structure 111 is positioned at the rear of vehicle 100, but other embodiments may comprise other arrangements without deviating from the teachings disclosed herein. The depicted embodiment may utilize the target structure 101 to calibrate sensors situated near the front of vehicle 100. Other embodiments may, by way of example and not limitation, orient the vehicle in the reverse direction such that first reference structure 107 is positioned near the rear of vehicle 100 and second reference structure 111 is positioned near the front of vehicle 100, thus placing target structure 101 in a position suitable to calibrate sensors disposed near the rear of vehicle 100.

Alignment of target structure 101, first reference structure 107 and second reference structure 111 may be achieved utilizing laser emitter 112. Laser emitter 112 may be disposed upon second reference structure 111 such that it is underneath the body of vehicle 100. In the depicted embodiment, laser emitter 112 may be adjustably positioned along the height of second reference structure 111, but other embodiments may comprise other configurations without deviating from the teachings disclosed herein. Laser emitter 112 may be activated to generate an emitted laser beam 113 in the direction of first reference structure 107. In the depicted embodiment, laser beam 113 travels underneath vehicle 100 through the pass-through channel 108 of first reference structure 107. Target structure 101 may then be positioned along datum line 103 such that it is in the path of emitted laser beam 113. Target structure 101 may then be aligned such that emitted laser beam 113 reflects off of reflective surface 102, forming a reflected beam 115. Alignment of target structure 101 may continue to be adjusted until reflected beam 115 is directed onto aiming surface 109 of first reference structure 107. Because emitted laser beam 113 and reflected beam 115 are emitted in a straight line, calibration apparatus may be aligned when reflected beam 115 terminates at a designated portion of aiming surface 109. In the depicted embodiment, laser emitter 112 may be a line generator, which may provide a visual indication of the path of emitted laser beam 113 and reflected beam 115. A visual indication of the path of the beams may be advantageous because it provides a visual reference of the alignment to a user at points along the beams other than the reflection or termination points.

In the depicted embodiment, an active sensor calibration may further be coordinated using a dongle 117 connected to a vehicle diagnostic port and operable to control the functions of vehicle sensors during calibration. In the depicted embodiment, dongle 117 is operable to connect to an OBD-II port of vehicle 100, but other embodiments may comprise other configurations without deviating from the teachings disclosed herein.

Figure 2:
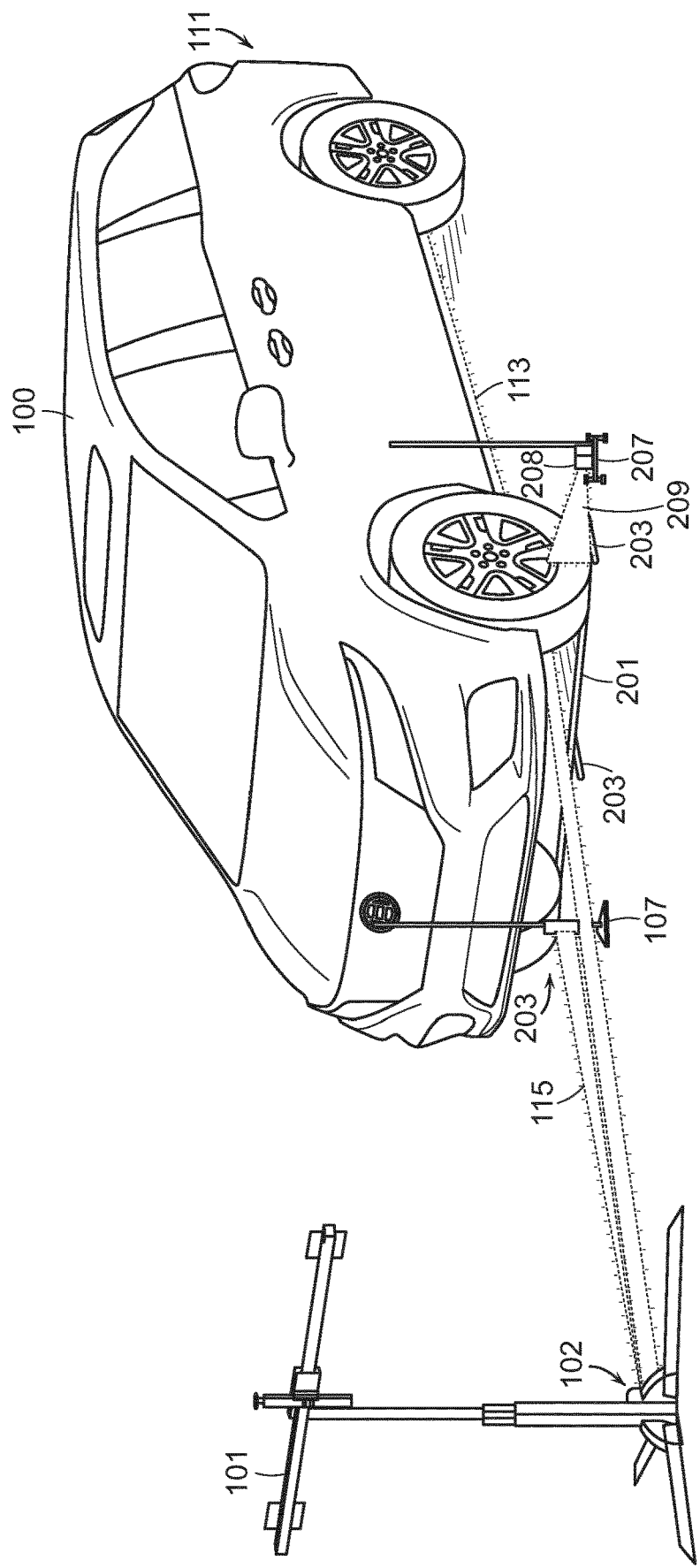
FIG. 2 is an illustration of the setup of a calibration apparatus in position with respect to a vehicle for a sensor calibration.

Additional components of the calibration apparatus may be used to properly position the target structure 101. FIG. 2 provides an illustration of additional such components during the setup of the apparatus for a sensor calibration of vehicle 100.

Because axle line 105 (not shown) is an abstract reference point to vehicle 100, the position and orientation of datum line 103 may be measured in relation to a physical measurement of vehicle 100. A crossbar structure 201 may be placed in a position parallel to axle line 105 by aligning the crossbar structure with the wheels of vehicle 100. Crossbar structure 201 may be placed against the treads of the front wheels of vehicle 100. In some embodiments, the crossbar structure may be positioned in a different location with respect to vehicle 100, such as against the treads of the rear wheels, aligned with a fender, or at any other reference point recognized by one of ordinary skill in the art without deviating from the teachings disclosed herein. In the depicted embodiment, the crossbar structure 201 is disposed behind the plane containing axle line 105, and a number of actuated members 203 may extend from crossbar structure 201 in the direction of axle line 105 for measurement of the distance between the body of crossbar structure 201 and the plane comprising axle line 105. Measurements are made between a point on an actuated member 203 and the center point of a wheel, and may be completed using rulers, tape measures, or any other suitable measuring instrument known to one of ordinary skill in the art. In the depicted embodiment, the measurement is completed using a third reference structure 207 having a second laser emitter 208. In the depicted embodiment, second laser emitter 208 is actively emitting a line laser 209, which will be described in additional detail below with respect to FIG. 3. In the depicted embodiment, third reference structure 207 may be functionally identical to a second reference structure 111, and in some embodiments the second reference structure 111 may be utilized for the purpose of determining the location of axle line 105 prior to being aligned with the appropriate side of vehicle 100 during sensor calibration.

Figure 3:
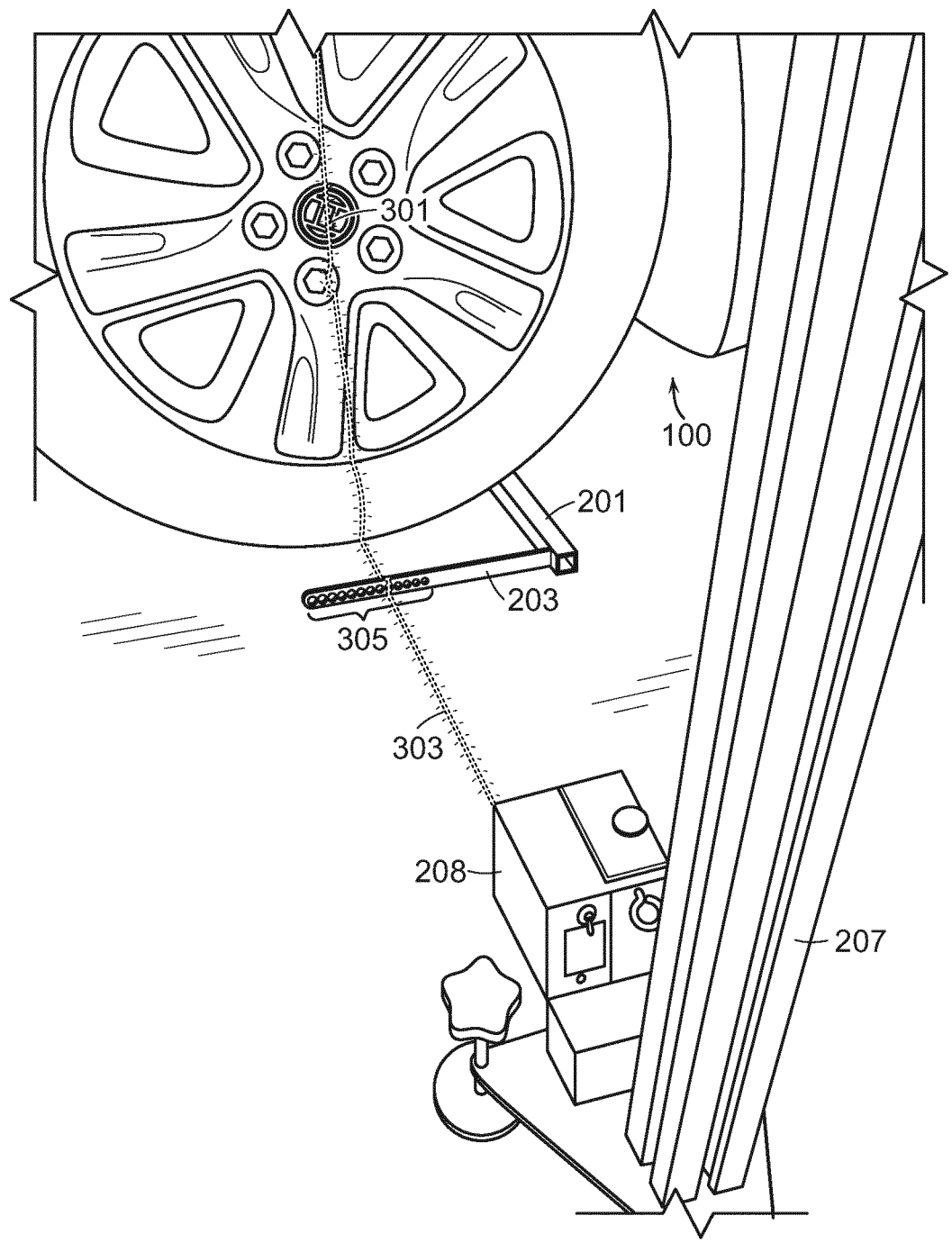
FIG. 3 is an illustration of a reference structure having a laser emitter measuring an axle line of a wheel with respect to a crossbar structure of a calibration apparatus.

FIG. 3 provides a close-up illustration of the use of third reference structure 207 to measure a center point 301 of a wheel with respect to crossbar structure 201 in one embodiment according to the teachings disclosed herein. In the depicted embodiment, crossbar structure 201 is placed in position against the tread of the front tires. The second laser emitter 208 is activated to generate an alignment beam 303. In the depicted embodiment, second laser emitter 208 is a line generator and alignment beam 303 is a visible line, but other embodiments may comprise other configurations without deviating from the teachings disclosed herein. After second laser emitter 208 is activated, third reference structure 207 may be positioned such that alignment beam 303 intersects center point 301. In the depicted embodiment, alignment beam 305 additionally intersects an actuated member 203 at one of a number of actuated measurements 305. The particular actuated measurement 305 that is intersected by alignment beam 303 will be inside a plane that also comprises axle line 105 (see FIG. 1). Thus, the particular actuated measurement 305 may be used as a reference in measuring the proper position of the datum line (see FIG. 1). In the depicted embodiment, the actuated member 203 is disposed alongside a wheel of vehicle 100, but some embodiments may comprise additional actuated members 203 at different points along crossbar structure 201. Referring back to FIG. 2, the depicted embodiment may comprise an additional actuated member 203 disposed at the center of crossbar structure 201. Utilizing the corresponding particular actuated measurement 305 of the centered actuated member 203 may advantageously assist a user in more quickly determining the proper position of target structure 101.

In the embodiment depicted in FIG. 3, actuated measurements 305 comprise a number of measured holes within actuated member 203, but other embodiments may comprise ruler markings, visual indicators, or any other form of actuated measurement recognized by one of ordinary skill in the art without deviating from the teachings disclosed herein. In the depicted embodiment, the measured holes may advantageously provide a physical latching point for a measuring instrument to couple to the actuated member 203 in properly measuring distance x (see FIG. 1) between the axle line 105 and the datum line 103. In the depicted embodiment, the distance x may be measured using a tape measure (not shown), but other embodiments may measure this distance utilizing a ruler, a cable of predetermined length, an optical range finder, or any other alternative distance-measuring instrument known to one of ordinary skill in the art without deviating from the teachings disclosed herein.

Figure 4:
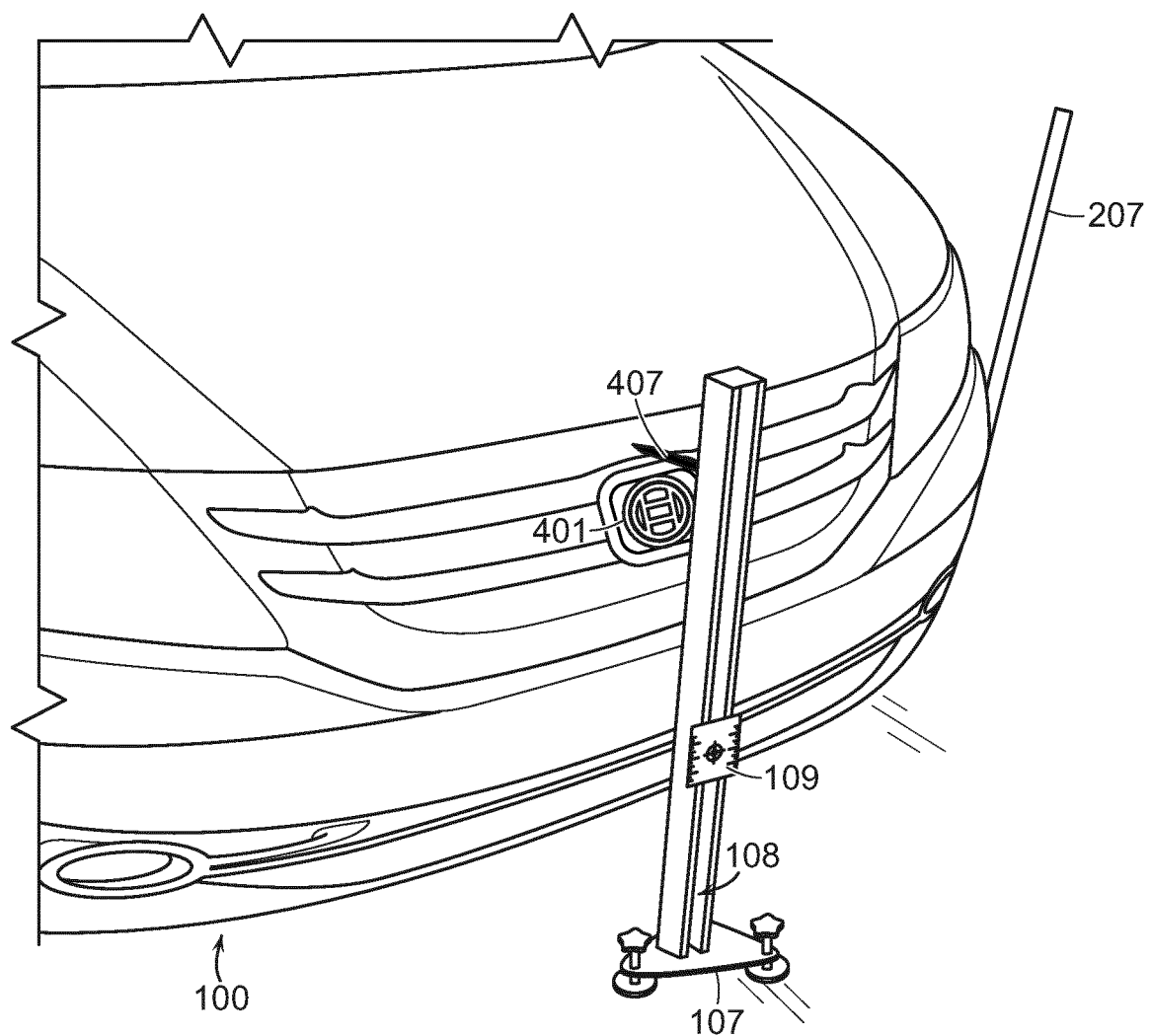
FIG. 4 is an illustration of a reference structure having a pass-through channel and an aiming surface positioned with respect to a vehicle in preparation for a sensor calibration of the vehicle.

FIG. 4 depicts a placement of first reference structure 107 in a position suitable for sensor calibration in relation to vehicle 100. In the depicted embodiment, first reference structure 107 may be placed at a midpoint of the front of vehicle 100. In the depicted embodiment, a vehicle emblem 401 may be centered upon the front of vehicle 100, and may provide a convenient point of reference for the midpoint of the front of vehicle 100. First reference structure 107 may comprise a first alignment indicator 407 that may indicate a midpoint of first reference structure 107. First reference structure 107 may be aligned to the vehicle 100 when first alignment indicator 407 is centered upon vehicle emblem 401. In the depicted embodiment first alignment indicator 407 may be positionable along the height of first reference structure 107 to accommodate a wider variety of configurations of vehicle 100, but other embodiments may comprise other configurations without deviating from the teachings disclosed herein. Other embodiments may comprise other ways to position first reference structure 107. In some embodiments, vehicle 100 may comprise a dedicated indicator showing the point of alignment for first reference structure 107. In some embodiments, the midpoint of the side of vehicle 100 may be determined using a measuring instrument such as a measuring tape, ruler, a member having predetermined length, a cable having a predetermined length, or any other measuring instrument known to one of ordinary skill in the art without deviating from the teachings disclosed herein. The depicted embodiment is directed to an alignment of first reference structure 107 with a midpoint of a side of vehicle 100, but other embodiments may comprise other alignments without deviating from the teachings disclosed herein. Some embodiments may comprise alternative arrangements according to the specification of vehicle 100 and the sensors disposed within vehicle 100.

FIG. 4 also provides additional details of first reference structure 107, in particular with respect to pass-through channel 108 and aiming surface 109. In the depicted embodiment, pass-through channel 108 comprises a channel formed from the bottom of aiming surface 109 extending to the base of first reference structure 107. Other embodiments may comprise other configurations of pass-through channel 107 without deviating from the teachings disclosed herein. In the depicted embodiment, aiming surface 109 comprises a crosshair pattern to provide visual indication of proper alignment, but other embodiments may comprise other configurations such as a bullseye, target, or any other alternative configuration recognized by one of ordinary skill in the art without deviating from the teachings disclosed herein. The visual indication of aiming surface 109 may advantageously provide a user with a visual reference of proper alignment such that when reflected beam 115 (see FIG. 1) intersects the illustrated portion of aiming surface 109 the apparatus is sufficiently aligned within specification of the sensors of vehicle 100.

Figure 5:
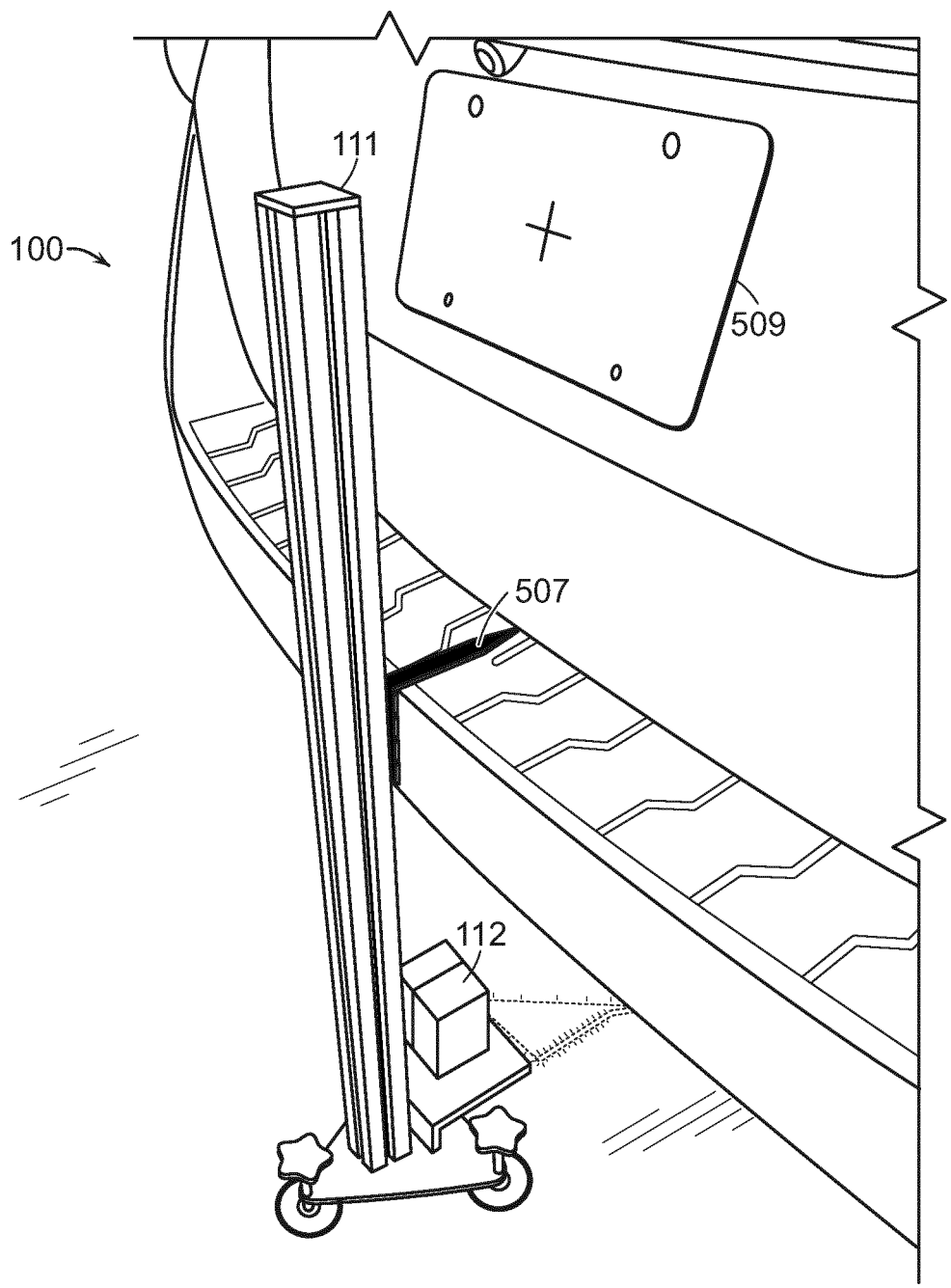
FIG. 5 is an illustration of a reference structure having a laser emitter positioned with respect to a vehicle in preparation for a sensor calibration of the vehicle.

FIG. 5 depicts the placement of the second reference structure 111 with respect to vehicle 100. In the depicted embodiment, second reference structure 111 may be placed at the midpoint of the rear of vehicle 100, but other embodiments may comprise other arrangements without deviating from the teachings disclosed herein. Second reference structure 111 may comprise a second alignment indicator 507 that may indicate a midpoint of second reference structure 111. In the depicted embodiment, second reference structure 111 may be aligned with the midpoint of the rear of vehicle 100 when second alignment indicator 507 is in alignment with the midpoint. In the depicted embodiment, the rear midpoint is measured, but other embodiments may comprise other forms of determining the midpoint. In some embodiments, the midpoint of the side of vehicle 100 may be determined using a measuring instrument such as a measuring tape, ruler, a member having predetermined length, a cable having a predetermined length, or any other measuring instrument known to one of ordinary skill in the art without deviating from the teachings disclosed herein. In some embodiments, a license plate 509 may be centered upon the rear of vehicle 100, and the midpoint may be measured with respect to license plate 509 rather than the entire rear of vehicle 100. In some embodiments, a rear vehicle emblem (not shown) may be present at a midpoint of the rear of vehicle 100, and second reference structure 111 may be aligned with respect to the rear vehicle emblem. In some embodiments, a distinct marking may indicate a midpoint of the rear of vehicle 100. In some embodiments, a locking mechanism may indicate a midpoint of the rear of vehicle 100. Other embodiments may comprise other arrangements recognized by one of ordinary skill in the art without deviating from the teachings disclosed herein. In the depicted embodiment, second alignment indicator 507 may be positionable along the height of second reference structure 111 to accommodate a wider variety of configurations for vehicle 100, but other embodiments may comprise other arrangements without deviating from the teachings disclosed herein.

It is additionally noted that the positioning techniques of first reference structure 107 and second reference structure 111 may be reversed in situations wherein a sensor disposed near the rear of vehicle 100 is intended to be calibrated. In such situations, the techniques described above to align first reference structure 107 with respect to the front of vehicle 100 may be utilized to align second reference structure 111, and the techniques described above to align second reference structure 111 with the rear of vehicle 100 may be utilized to align first reference structure 107. Other embodiments may comprise other arrangements of vehicle 100 with respect to the vehicle sensor calibration apparatus without deviating from the teachings disclosed herein.

Figure 6:
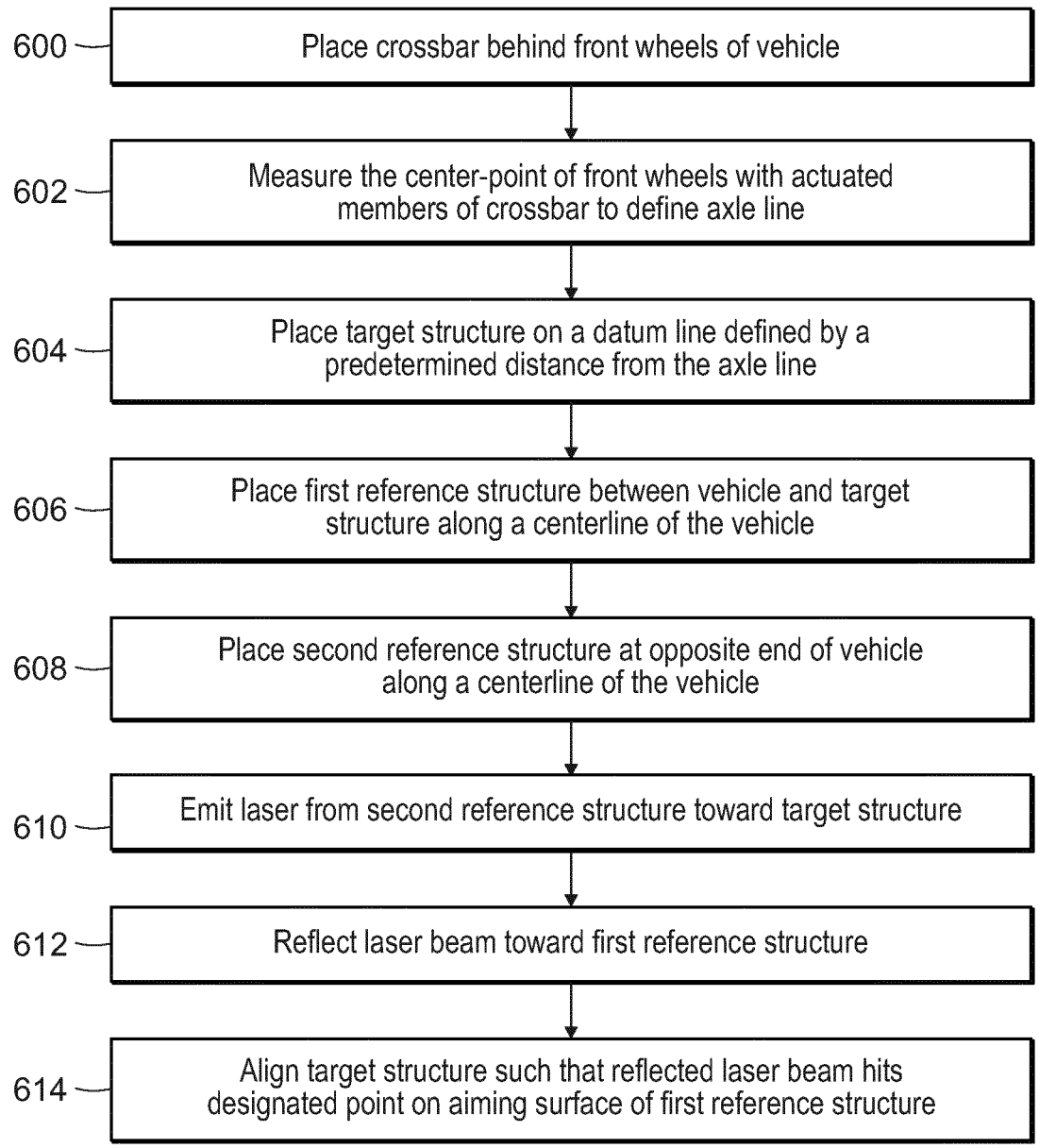
FIG. 6 is a flowchart describing a method of placing a calibration apparatus in position with respect to a vehicle to prepare for a sensor calibration of the vehicle.

FIG. 6 depicts a flowchart showing a method of arranging the vehicle calibration apparatus for sensor calibration of a vehicle according to one embodiment of the teachings disclosed herein. The method begins at step 600 by placing a crossbar structure behind the front wheels of the vehicle. Based upon the position of the crossbar structure, the center-point of each front wheel is measured at step 602 to define an axle line.

At step 604, a target structure is placed upon a datum line defined by a predetermined distance from the axle line. In the depicted embodiment, the predetermined distance is measured in a horizontal direction, i.e., the datum line is defined as a line that is a predetermined distance from the plane comprising the axle line and perpendicular to the supporting surface of the vehicle (e.g., perpendicular to the ground or floor). After the target structure is placed on the datum line, a first reference structure is aligned with the midpoint of the side of the vehicle nearest to the target structure at step 606. At step 608, a second reference structure is aligned with the opposite side of the vehicle such that a laser emitter of the second reference structure is oriented toward the first reference structure.

At step 610, the laser emits a beam from the second structure toward the target structure, and in the depicted embodiment the laser beam is emitted through a pass-through channel of the first reference structure. At step 612, the target structure is positioned along the datum line such that a reflective surface of the target structure reflects the emitted laser beam back toward the first reference structure. Once the reflective surface is in position to reflect the laser beam, at step 614 the target structure's alignment is fine-tuned until the reflected laser beam hits a designated portion of an aiming surface disposed upon the first reference structure. Once the reflected laser beam is hitting the designated portion of the aiming surface, the calibration apparatus is aligned.

One of ordinary skill will recognize that other embodiments may comprise other sequences without deviating from the teachings disclosed herein. For example, the order of the placement of the target structure, first reference structure, and second reference structure does not affect the end result of alignment, so long as the emitted laser beam and reflected laser beam are properly adjusted to pass through the pass-through channel and hit the designated portion of the aiming surface respectively. FIG. 6 comprises one embodiment of the teachings disclosed herein, and is presented by way of example and not limitation.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A vehicle sensor calibration apparatus operable to calibrate a sensor of a vehicle, the calibration apparatus comprising:
   a target structure having a reflective surface;
   a crossbar structure operable to provide a reference to a datum line along which the target structure is positioned during sensor calibration;
   a first reference structure having a pass-through channel and an aiming surface, the first reference structure operable to be aligned with a midpoint of a first side of the vehicle nearest to the datum line; and
   a second reference structure having a laser emitter and operable to be aligned with a midpoint of a second side of the vehicle furthest from the datum line and opposite from the first side, with the laser emitter oriented toward the datum line such that the laser when emitted passes underneath the vehicle and through the pass-through channel.

2. The vehicle sensor calibration apparatus of claim 1, wherein the target structure comprises a tripod structure and the reflective surface is disposed at least in part on the base of the tripod.

3. The vehicle sensor calibration apparatus of claim 1, wherein the laser emitter is positionable to emit a laser beam underneath the body of the vehicle.

4. The vehicle sensor calibration apparatus of claim 3, wherein the laser emitter is positionable to emit the laser beam through the pass-through channel of the first reference structure.

5. The vehicle sensor calibration apparatus of claim 4, wherein when the laser emitter is positioned to emit the laser beam through the pass-through channel of the first reference structure the target structure is aligned to reflect the laser beam off the reflective surface onto the aiming surface of the first reference structure.

6. The vehicle calibration apparatus of claim 1, wherein the laser emitter is a line generator.

7. The vehicle calibration apparatus of claim 1, wherein the crossbar structure is operable to provide reference to the datum line in relation to a center point of a wheel of the vehicle.

8. The vehicle calibration apparatus of claim 7, further comprising a third reference structure having a laser emitter operable to measure the center point of the wheel of the vehicle in relation to the crossbar structure.

9. The vehicle calibration apparatus of claim 1, further comprising a vehicle dongle operable to connect to a diagnostic port of the vehicle and control the sensors of the vehicle during sensor calibration.

10. A method of aligning a target structure having a reflective surface in front of a vehicle having a sensor requiring calibration using the target structure, the method comprising:
    placing the target structure on a datum line defined at a predetermined distance from an axle line of the vehicle;
    placing a first reference structure having a pass-through channel and an aiming surface in a position at a midpoint of a first side of the vehicle nearest to the datum line;
    placing a second reference structure having a laser emitter in a position at a midpoint of a second side of the vehicle furthest from the datum line and opposite the first side, the second reference structure oriented with the laser emitter aimed toward the first reference structure;
    emitting an emitted laser beam from the laser emitter of the second reference structure underneath the vehicle and through the pass-through channel of the first reference structure;
    positioning the target structure at a reflection position on the datum line wherein the emitted laser beam is reflected by the reflective surface resulting in a reflected beam; and
    adjusting the relative angle and alignment of the target structure at the reflection position such that the reflected beam is reflected onto a designated region of the aiming surface on the first structure.

11. The method of claim 10, wherein the axle line is defined by the rotation point of a wheel of the vehicle.

12. The method of claim 11, wherein the axle line is defined by the rotation point of a front wheel of the vehicle.

13. The method of claim 11, wherein the rotation point of the wheel of the vehicle is measured using a third reference structure utilizing a second laser emitter.

14. The method of claim 11, wherein the rotation point of the wheel of the vehicle is further measured with respect to a crossbar structure having an articulated measurement member, the crossbar structure used to provide a reference to the datum line.

15. The method of claim 11, wherein the rotation point of the wheel of the vehicle is measured using the laser emitter of the second reference structure.

16. The method of claim 15, wherein the rotation point of the wheel of the vehicle is further measured using a crossbar structure having an articulated measurement member, the crossbar structure being used to provide a reference to the datum line.

17. The method of claim 10, wherein the side of the vehicle nearest to the datum line is the front of the vehicle.

* * * * *